(12) United States Patent
Kerschbaum

(10) Patent No.: US 9,159,046 B2
(45) Date of Patent: Oct. 13, 2015

(54) SYSTEMS AND METHODS FOR IMPLEMENTING SUPPLY CHAIN VISIBILITY POLICIES

(75) Inventor: Florian Kerschbaum, Karlsruhe (DE)

(73) Assignee: SAP SE, Walldorf (DE)

( * ) Notice: Subject to any disclaimer, the term of this patent is extended or adjusted under 35 U.S.C. 154(b) by 1086 days.

(21) Appl. No.: 12/493,650

(22) Filed: Jun. 29, 2009

(65) Prior Publication Data

US 2010/0329464 A1 Dec. 30, 2010

(51) Int. Cl.
  *G06F 21/00* (2013.01)
  *G06Q 10/08* (2012.01)
  *G06F 21/62* (2013.01)

(52) U.S. Cl.
  CPC .......... *G06Q 10/087* (2013.01); *G06F 21/6209* (2013.01)

(58) Field of Classification Search
  CPC .. H04L 9/3265; G06Q 10/087; G06F 21/445; G06F 21/6209; G06F 3/1204; G06F 2221/2153
  USPC ........ 380/45, 279; 713/168, 70, 176, 170, 45, 713/279
  See application file for complete search history.

(56) References Cited

U.S. PATENT DOCUMENTS

| | | | |
|---|---|---|---|
| 8,527,539 B2* | 9/2013 | Traub et al. | 707/781 |
| 2008/0069347 A1* | 3/2008 | Brown et al. | 380/45 |
| 2008/0150702 A1* | 6/2008 | Neill et al. | 340/10.42 |
| 2008/0164976 A1* | 7/2008 | Griffiths-Harvey et al. | 340/10.1 |
| 2010/0138926 A1* | 6/2010 | Kashchenko et al. | 726/25 |
| 2010/0329464 A1* | 12/2010 | Kerschbaum | 380/279 |

FOREIGN PATENT DOCUMENTS

| | | |
|---|---|---|
| WO | WO2007006005 A2 | 1/2007 |
| WO | WO2006070189 A3 | 7/2007 |

OTHER PUBLICATIONS

European Search Report in Application No. 10006688.5 dated Nov. 26, 2010, 7 pages.
Eberhard Grummt et al., "Proof of Possession: Using RFID for Large-Scale Authorization Management," Constructing Ambient Intelligence, AmI 2007 Workshops, Nov. 7-10, 2007, Darmstadt, Germany, pp. 174-182.

(Continued)

*Primary Examiner* — Hadi Armouche
*Assistant Examiner* — Ali Shayanfar
(74) *Attorney, Agent, or Firm* — Fish & Richardson P.C.

(57) ABSTRACT

Methods, storage medium and systems for implementing visibility policies within a supply chain include storing event data on a computer-readable storage medium of a first partner, the event data corresponding to at least one event associated with an item while the item was in possession of the first partner, the item having traveled through the supply chain, transferring evidence of possession between the plurality of partners as the item travels through the supply chain, and requesting access to the event data by a second partner. Implementations further include determining that the item traveled through a portion of the supply chain based on the evidence, authenticating an identity of the second partner, and authorizing the second partner to access the first event data, when it is determined that the item traveled through the portion of the supply chain and when the identity of the second party is authenticated.

14 Claims, 9 Drawing Sheets

(56) References Cited

OTHER PUBLICATIONS

Yoon-Su Jeong et al., "RFID Authentication Protocol Using Synchronized Secret Information," First International Symposium on Data, Privacy and E-commerce (ISPDE 2007), Nov. 1-3, 2007, Chengdu, China, pp. 459-461.

Mikko Lehtonen et al., "Securing RFID Systems by Detecting Tag Cloning," Pervasive '09 Proceedings of the 7th International Conference on Pervasive Computing, LNCS 5538, May 11, 2009, pp. 291-308.

Boneh and Franklin, "Identity-based Encryption from the Weil Pairing," Proceedings of Crypto, 2001, 31 pages.

Boneh et al., "Hierarchical Identify Based Encryption with Constant Size Ciphertext," Proceedings of Eurocrypt, 2005, 29 pages.

Bornhvd et al., "Integrating automatic data acquisition with business processes—Experiences with SAP's auto-ID infrastructure," Proceedings on the 30th International Conference on Very Large Databases, 2004, pp. 1182-1188.

Feldhofer et al., "Strong Authentication for RFID Systems Using the AES Algorithm," Proceedings of the International Workshop on Cryptographic Hardware and Embedded Systems, 2004.

Juels, "Yoking-proofs for RFID Tags," Proceedings of the 2nd IEEE Annual Conference on Pervasive Computing and Communications PerSec Workshop, 2004, 6 pages.

Merkle, "A Certified Digital Signature," in Advances in Cryptology—Crypto, (Springer-Verlag, Berlin, 1998), pp. 218-238.

Kerschbaum, "An Access Control Model for Mobile Physical Objects," Proceedings of the 15th ACM Symposium on Access Control Models and Technologies, SACMAT'10, Jun. 9-10, 2010, 10 pages.

\* cited by examiner

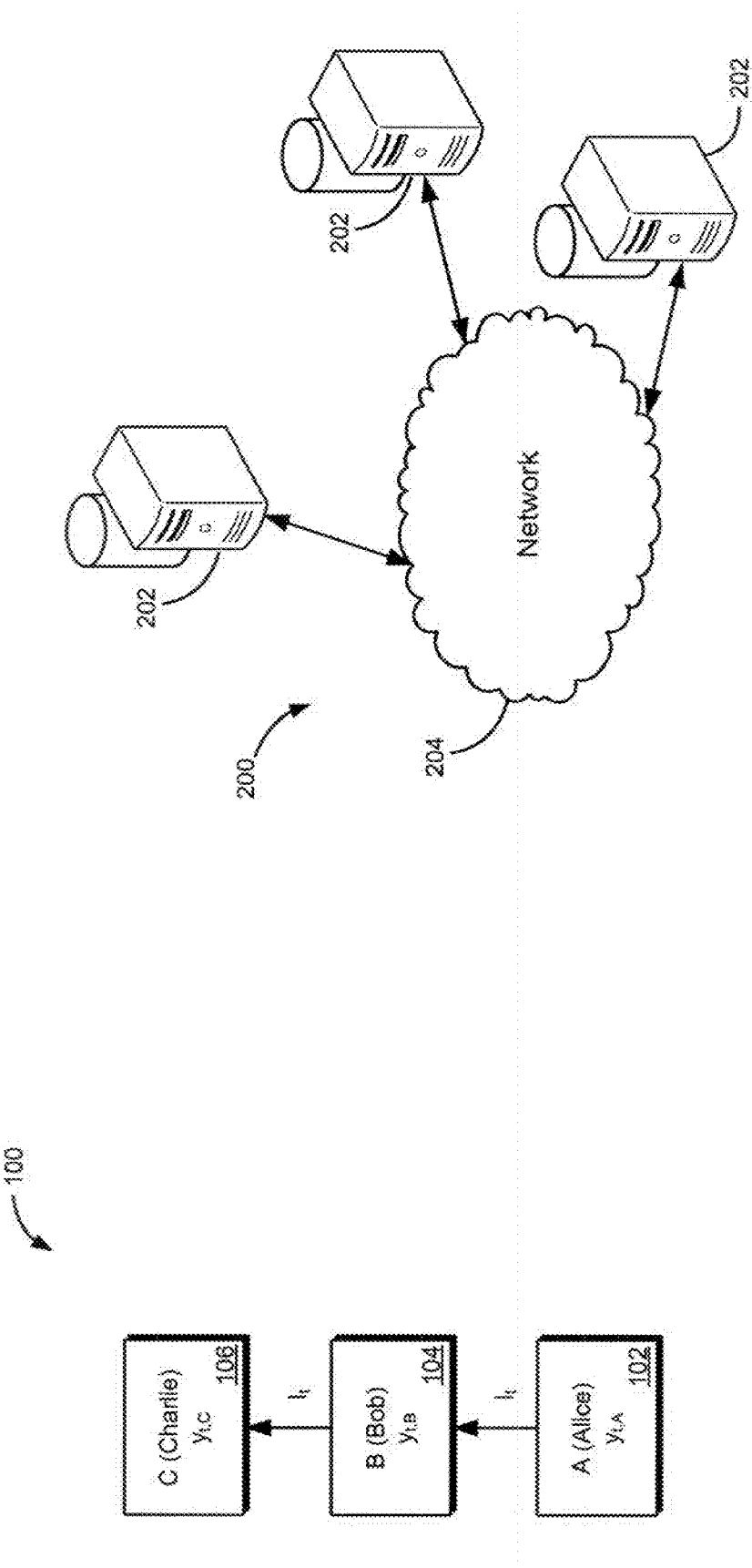

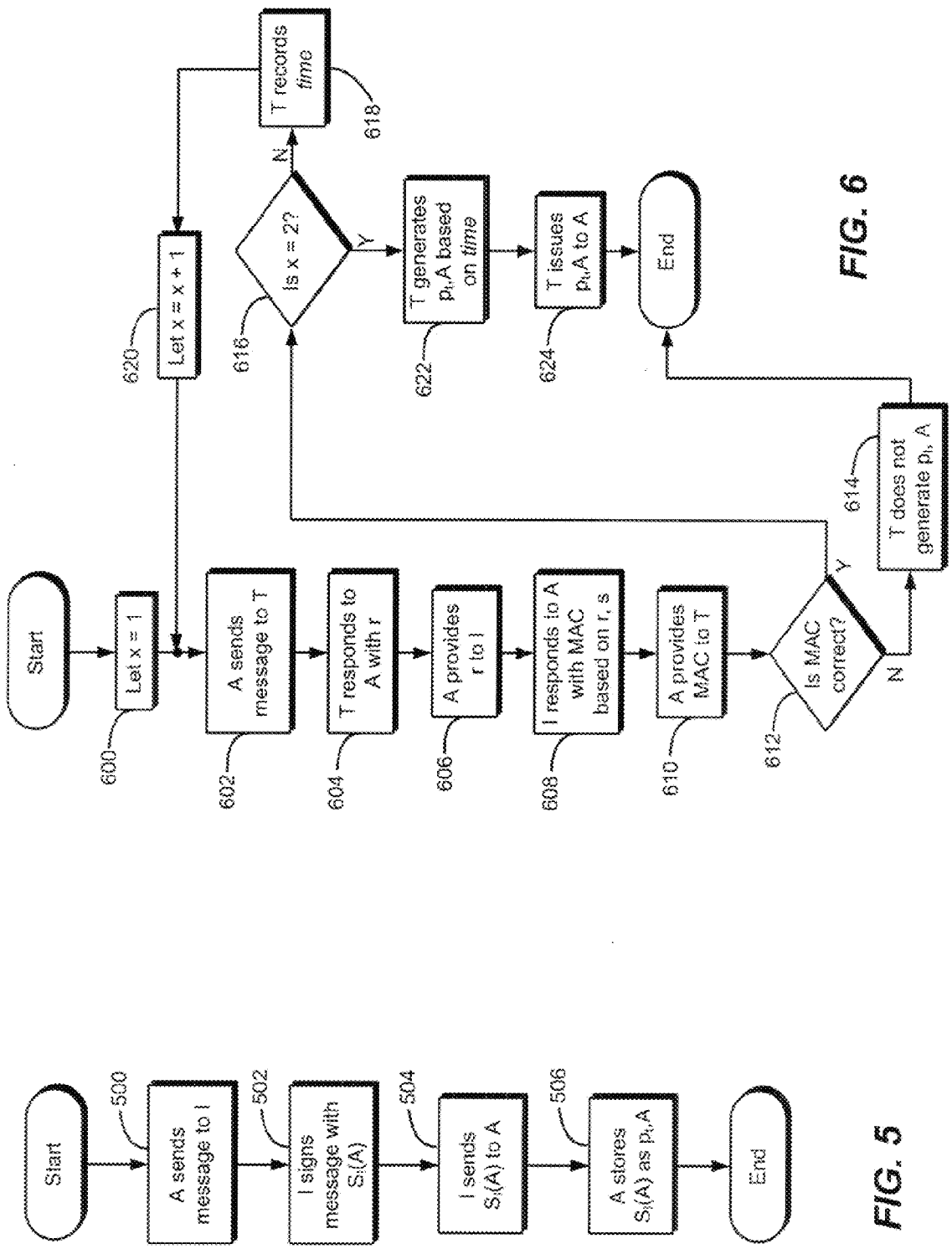

SYSTEMS AND METHODS FOR IMPLEMENTING SUPPLY CHAIN VISIBILITY POLICIES

BACKGROUND

Global supply chain visibility is becoming increasingly important, particularly as manufacturing is moved to various worldwide locations to lower costs associated with product manufacturing. With supply chains lengthening, it is becoming more important to have visibility of supply chain information related to products while the products are in transit.

Transportation between the manufacturer and the location of the product's final destination has become a major component of the supply chain. Thus, the visibility of the product in transit is crucial to managing logistical issues at supplier locations. For example, when ocean freight carriers are used to transport products to and from worldwide locations, transit times can reach upwards of 30 days. In such an example, logistics service providers in the supply chain manage the movement of freight and provide visibility to other supply chain partners.

SUMMARY

Implementations of present disclosure include methods for implementing visibility policies within a supply chain that includes a plurality of partners. In some implementations, such a method includes storing event data on a computer-readable storage medium of a first partner, the event data corresponding to at least one event associated with an item while the item was in possession of the first partner, the item having traveled through the supply chain, transferring evidence of possession between the plurality of partners as the item travels through the supply chain, and requesting access to the event data by a second partner. The method further includes determining that the item traveled through a portion of the supply chain associated with at least the first partner and the second partner, based on the evidence, authenticating an identity of the second partner, and authorizing the second partner to access the first event data from the computer-readable storage medium, when it is determined that the item traveled through the portion of the supply chain and when the identity of the second party is authenticated.

In some implementations, the method further provide that the evidence includes proofs of possession corresponding to the second partner and any intermediate partners between the first partner and the second partner along the portion of the supply chain.

In some implementations, the method further provides that determining whether the portion of the supply chain is valid is further based on chaining tokens that are generated by each of the first and second partners, and any intermediate partners between the first partner and the second partner along the portion of the supply chain.

In some implementations, the method further provides generating a proof of possession corresponding to the second partner as one of a signature-based proof of possession, a shared secret proof of possession, a token-based proof of possession and a time-based proof of possession, the evidence including the proof of possession. In such implementations, the shared secret proof of possession and the time-based proof of possession can be generated based on communication between the second partner and a trusted third party. In such implementations, the signature-based proof of possession can be generated based on a signature generated by a tag associated with the item, the shared secret proof of possession can be generated based on a secret that is shared between a tag associated with the item and a first trusted third party, and the time-based proof of possession can be generated based on a random challenge sent to a second trusted third party and a timestamp issued by the second trusted third party.

In some implementations, the method further include encrypting the event data by the first partner, obtaining a decryption key from a trusted third party based on the evidence, and decrypting the event data using the decryption key by the second partner.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing visibility policies within a supply chain that includes a plurality of partners. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is to say that methods in accordance with the present disclosure are not limited to the combinations of aspects and features specifically described herein, but also include any combination of the aspects and features provided.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 1 is a block diagram of an exemplar supply chain.

FIG. 2 is a schematic illustration of an exemplar architecture corresponding to the exemplar supply chain of FIG. 1.

FIG. 5 is a flowchart illustrating exemplar steps that can be executed to provide a signature-based proof of possession in accordance with implementations of the present disclosure.

FIG. 6 is a flowchart illustrating exemplar steps that can be executed to provide a shared secret proof of possession in accordance with implementations of the present disclosure.

Like reference symbols in the various drawings indicate like elements.

DETAILED DESCRIPTION

Figure 3:
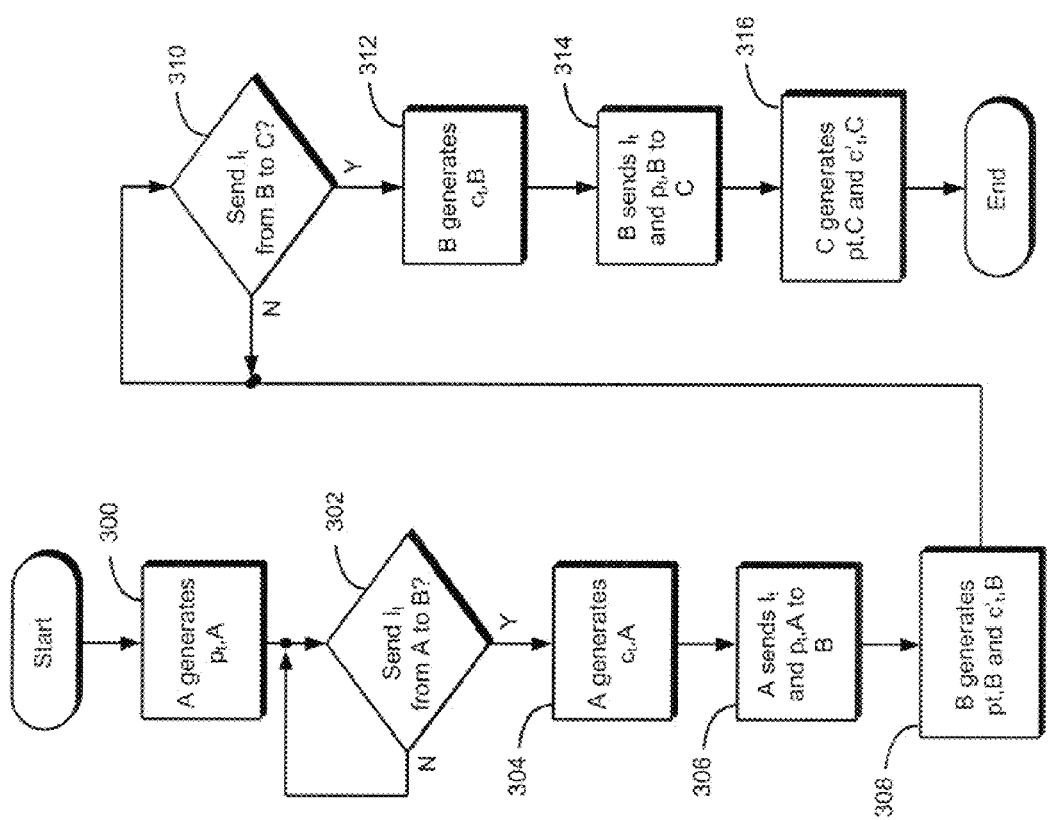
FIG. 3 is a flowchart illustrating exemplar steps that can be executed when transferring an item through the exemplar supply chain of FIG. 1 in accordance with implementations of the present disclosure.

FIG. 1 is a block diagram of an exemplar supply chain 100. In general, the supply chain 100 represents a system of organizations, people, technology, activities, information, and/or resources involved in moving information, products, and/or services between supply chain parties. For example, the supply chain 100 can enable data sharing between (i) a supplier and a customer, (ii) a supplier and another supplier, and/or (iii) a customer and another customer. The suppliers and customers can increase efficiency in providing and/or receiving services by analyzing shared data available upstream and downstream within a particular supply chain. In particular, access to this data allows new forms of analytics improving the efficiency of the supply chain.

In some implementations, the shared data can be radio frequency identification (RFID) tracking data or any data stored in an Enterprise Resource Planning (ERP) system including, but not limited to stock levels, billing information, or shipping notifications. Shared data can be spread across multiple ERP systems and multiple supply chains. Although the shared data is provided by multiple sources, the data is stored in one or more ERP systems that do not distinguish between supply chains. Therefore, the companies storing supply chain data can implement access control rules to prevent data loss, data theft and/or espionage (e.g., spying on business operations) within a particular supply chain. The access control rules may be implemented in software, hardware, or a combination of both. For example, one way to implement supply chain policies includes RFID tracking systems that allow a company to control access to data based on the supply chain it pertains to and the partner or party requesting access.

Access control rules provide a mechanism to authorize or deny a business partner or other entity access to data in a particular supply chain. In general, the access control rules include a number of supply chain visibility rules and/or policies. If, for example, supply chain visibility rules provide liberal access to data in the supply chain, business partners may use the information to spy on other business partners and associated business operations. Particularly, if the data is too readily available throughout the supply chain, sensitive business data detailing volumes of business, structure and supply chain partners, for example, can be used against business partners in the supply chain. In one example, a supplier (S1) sells a product (p1) to buyers (B1) and (B2). If (B1) has access to all scheduled orders for (p1), (B1) could infer the volume of business with (B2). For example, if (S1) were to cancel some orders due to a temporary capacity reduction, such as may occur with a production machine failure, (B1) could infer whether (B2)'s orders are treated preferentially.

Supply chain visibility policies can include requirements such as providing evidence in the form of a proof of possession of an item at some point in the supply chain of the item. The proof of possession can be verified by a third party to convince the third party that the presenter of the proof actually had possession of the item at some point in time. In some implementations, the evidence may be stored on a radio frequency identification (RFID) tag (t). The RFID tags may each have a unique identifier that can be read by a business partner each time a tagged item ($I_t$) is handled within a supply chain. Each time the item ($I_1$) is handled, an event is stored on the tag (t). Event data may relate to, but is not limited to, unpacking items, shipping items, and receiving items.

Evidence can also be provided in the form of a chaining token. In general, chaining tokens represent a data entity that a business partner possesses and controls that may be used to authenticate the partner's identity. In one example, the chaining token may be a cryptographic key that is protected by encrypting it under a password. In particular, a chaining token is a signed statement that a party (e.g., $X_{i\_k}$) has either sent or received a tag with identifier (t) from another party (e.g., $X_{i+n\_k}$). In general, links of a supply chain are tied together by chaining tokens and the system can use identity-based encryption (IBE) to encrypt the event data and protect access to the chaining token information. Chaining tokens may be represented as:

$$c_t, x_{i\_k} = S_{Xi\_k}(I, X_{i+n\_k}, \text{sent}|\text{received})$$

if the party ($X_{i\_k}$) has "sent" a tag with identifier (t) to, or "received" a tag with the identifier (t) from another party ($X_{i+n\_k}$).

In some implementations, the supply chain visibility policies can be applied to data and/or business partners to distinguish between down-stream and up-stream data visibility. For example, down-stream visibility rules can ensure that a supply chain partner is allowed to access data associated with products that it has shipped to its partners at those partners. Up-stream visibility rules can ensure that a supply chain partner is allowed access to data associated with products that the partner has received from other business partners.

Referring again to FIG. 1, the supply chain 100 includes three stages with one business partner at each stage. The three business partners include Alice (A) 102, Bob (B) 104, and Charlie (C) 106. Each partner stores datasets ($y_t$) within a respective internal database. For example, the database stored by Alice 102 is represented by ($y_{t,A}$). Similarly, the databases stored by Bob 104 and Charlie 106 are represented by ($y_{t,B}$) and ($y_{t,C}$), respectively.

The supply chain 100, in this example, includes an item (I) with an attached tag (t) and is represented by ($I_t$). The item ($I_t$) is sent from Alice 102 to Bob 104, and is subsequently forwarded to Charlie 106. In this example, if Charlie 106 desires access to event data stored by Alice 102, Charlie 106 must present evidence that access should be granted. For example, Charlie 106 can present a proof of possession to Alice 102 to prove that access to the event data stored by Alice 102 should indeed be granted. At a high level, if Charlie 106 desires access to data stored by Alice 102, Charlie 106 shows proof of having information from every supplier between Alice 102 and himself. In this example, the proof of possession can be obtained from Bob 104 and then presented to Alice 102. Alice 102 can then verify and allow or deny access accordingly. The details of this process are described below.

FIG. 2 is a schematic illustration of an exemplar architecture 200 corresponding to the exemplar supply chain 100 of FIG. 1. The architecture 200 may represent a supply chain supporting multiple ERP computer systems 202 that are connectively coupled for communication with one another over a network 204. The ERP computer systems 202 can be modeled as a database and/or server system including a database, which abstracts data from other functions throughout supply chain software installed on the systems 202.

System 200 is typically a distributed client/server system that spans one or more networks such as network 204. In such cases, the various components—such as ERP systems 202— may communicate via a virtual private network (VPN), Secure Shell (SSH) tunnel, or other secure network connection. Accordingly, rather than being delivered as packaged software, system 200 may represent a hosted solution that may scale cost-effectively and help drive faster adoption. In this case, portions of the hosted solution may be developed by a first entity, while other components are developed by a second entity. In such embodiments, data may be communicated or stored in an encrypted format using any standard or proprietary encryption algorithm. This encrypted communication may be between the user (or application/client) and the host or amongst various components of the host. Put simply, communication or other transmission between any modules and/or components may include any encryption, export, translation or data massage, compression, and so forth as appropriate. Further, system 200 may store some data at a relatively central location (over a WAN) while concurrently maintaining local data at the user's site for redundancy and to allow processing during downtime. But system 200 may be in a dedicated enterprise environment—across a local area network (over LAN) or subnet—or any other suitable environment without departing from the scope of the present disclosure.

The techniques and components described herein may be implemented within an Enterprise Service Architecture (ESA) environment, often termed a Service Oriented Architecture (SOA). In certain implementations, SOA can be considered a blueprint for an adaptable, flexible, and open architecture for developing services-based, enterprise-scale business solutions. The respective enterprise service is typically a series of web services combined with business logic that can be accessed and used repeatedly to support a particular business process. Aggregating such web services into business-level enterprise services may provide a more meaningful foundation for the task of automating enterprise-scale business scenarios. The composite application framework comprises rules framework, design tools, methodologies, services and processes, an abstraction layer for objects, and user interface and process pattern libraries. The composite application framework supports model-driven application composition, so a user may build applications and/or implement supply chain policies with as little programming as possible, which often results in reduced development and deployment time for new/modified applications and business-pattern-oriented integration.

FIG. 3 is a flowchart illustrating exemplar steps that can be executed when transferring an item through the exemplar supply chain 100 of FIG. 1 in accordance with implementations of the present disclosure. For example, the process shown in FIG. 3 may be implemented using software instructions stored in a computer-readable storage medium and executed by a processing system including one or more processing apparatus. Briefly, the steps include generating and verifying proofs of possession and chaining tokens along the supply chain between example partners Alice (A), Bob (B), and Charlie (C). The proofs of possession and chaining tokens may allow the transfer of an item $(I_t)$ throughout the supply chain 100. In general, each business partner 102, 104, 106 can store event data about item $(I_t)$ in a local database $(y_t)$, and access to the event data can be requested by other business partners in the supply chain 100. In some implementations, each partner stores a proof of possession and a number of chaining tokens. In the event that a particular partner chooses not to reveal event data according to either upstream or downstream visibility, it can provide access to the proof of possession and chaining tokens for valid requests to prevent a break in the chain of possession.

In step 300, A generates a proof of possession $(p_{t,A})$ of having possessed item $(I_t)$. In step 302, the system (e.g., system 200) may receive a request from a business partner to send an item through the supply chain 100. For example, the item $(I_t)$ may be sent to B from A. If item $(I_t)$ is sent to B, A generates a "sent" chaining token $(c_{t,A})$ in step 304. If the system does not receive a request to send item $(I_t)$, the process continues to wait for a request before continuing. Upon generating the chaining token $(c_{t,A})$, A sends the item $(I_t)$ and A's own proof of possession $(p_{t,A})$ to B in step 306. In step 308, B receives the chaining token from A, and generates his own proof of possession $(p_{t,B})$ and "received" chaining token $(c'_{t,B})$. In step 310, the system (e.g., system 200) determines whether the item $(I_t)$ is to be sent from B to C. If the item $(I_t)$ is not to be sent, the system loops back. If the item $(I_t)$ is to be sent, B generates a "sent" chaining token $(c_{t,B})$ in step 312. In step 314, B sends the item $(I_t)$ and his proof of possession $(p_{t,B})$ to C. C generates his own proof of possession $(p_{t,C})$ and a "received" chaining token $(c'_{t,C})$ in step 316. Accordingly, the item $(I_t)$ has successfully passed through the supply chain 100.

The subsequent discussion and corresponding flow charts provide exemplar routines that add varying levels of security (e.g., cryptography) to enforce policies for retrieving and sending supply chain data. The supply chain can employ various techniques to enforce security policies including, but not limited to time-based proof of possession, signature-based proof of possession, shared-secret based proof of possession, token-based proof of possession, and identity-based encryption.

Figure 4:
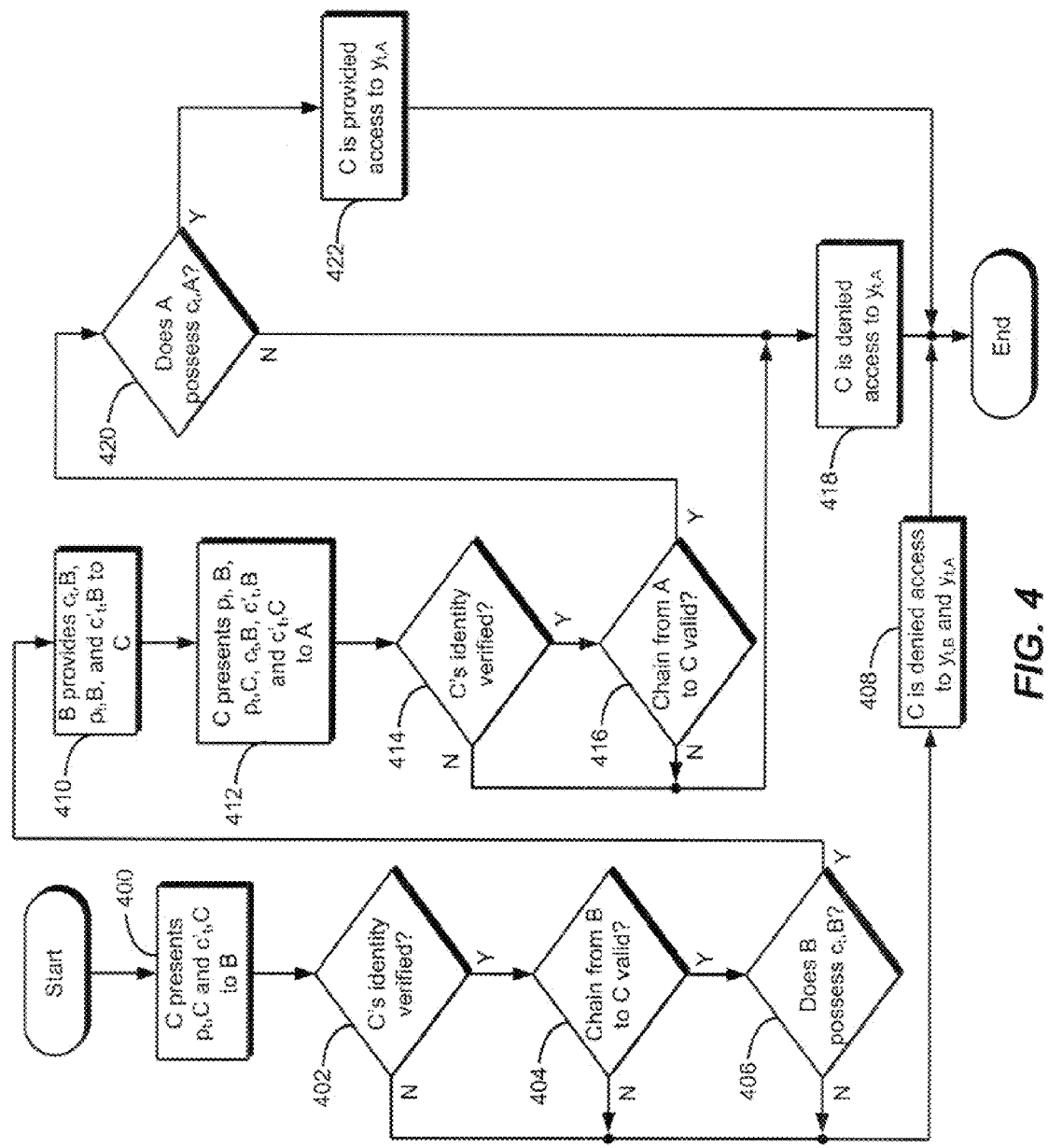
FIG. 4 is a flowchart illustrating exemplar steps that can be executed to provide access to event data within the exemplar supply chain of FIG. 1 in accordance with implementations of the present disclosure.

Referring now to FIG. 4, a flowchart illustrates exemplar steps that can be executed to provide access to event data within the exemplar supply chain 100 of FIG. 1. The flowchart of FIG. 4 is premised on a request by C to access event data from A. In step 400, C presents his proof of possession $(p_{t,C})$ and his received chaining token $(c'_{t,C})$ to B. A series of verification tests can be performed to validate C's presented information, which are discussed in further detail below. For example, in step 402, it is determined whether C's identity can be verified, in step 404 it is determined whether the chain from B to C is valid, and in step 406, it is determined whether B possesses a sent chaining token $(c_{t,B})$. If any of these conditions is not true, C is denied access to the event data stored by B (e.g., event data $y_{t,B}$), and the event data stored by A (e.g., event data $y_{t,A}$) in step 408. If, however, all three verification tests 402, 404, and 406 are true, B provides the sent chaining token $(c_{t,B})$, received chaining token $(C'_{t,B})$, and proof of possession $(p_{t,B})$ to C in step 410, and C is granted access to the event data stored by B (e.g., event data $y_{t,B}$).

In step 412, C presents the proof of possession $(p_{t,B})$, the sent chaining token $(c_{t,B})$, the received chaining token $(c'_{t,B})$, the received chaining token $(c'_{t,C})$, and the proof of possession $(p_{t,C})$ to A. A series of verification tests are executed to validate the information presented by C. In step 414, it is determined whether C's identity can be verified, and in step 416, it is determined whether the chain from A 102 to C 106 is valid. If either step 414 or step 416 is not true, C is denied access to event data stored by A (e.g., data $y_{t,A}$). If, however, step 414 and step 416 are both true, it is determine whether A possesses the sent chaining token $(c_{t,A})$ in step 420. If A does not possess the sent chaining token $(c_{t,A})$, C is denied access to event data $(y_{t,A})$ in step 418. If A does possess the sent chaining token $(c_{t,A})$, C is granted access to event data $(y_{t,A})$ in step 422.

Referring now to FIG. 5, a flowchart illustrates exemplar steps that can be executed to provide a signature-based proof of possession in accordance with implementations of the present disclosure. In some implementations, signature-based proofs of possession can be performed using cryptographic hash functions. By way of one non-limiting example, Merkle signatures may be used to combine several keys of a one-time signature scheme (OTS). An advantage of a Merkle signature is that it can be computed without modular arithmetic, trapdoors or similar, and is simply based on cryptographic hash functions. The use of Merkle signatures is merely exemplar in nature and is not intended to limit the present disclosure.

As described above, each time a supply chain partner obtains a tag (t), it creates a proof of possession. In the instant example, the proof of possession is signature-based and includes a public key/private key pair such that the private key is inaccessibly stored on the tag (t). As such, the tag (t) can be used to sign messages sent to it in order to verify the receipt of the tagged item ($I_t$). The signature of a tag (t) with an identifier (I) can be represented by $S_I(\ldots)$.

In step 500, A sends a message to the item (I), which item is in A's possession. This message can be sent, for example, to an RFID tag associated with the item (I). By way of one non-limiting example, A may send an event data request about where the item (I) was last processed. In the simplest case, the tag (t) simply answers the message by signing the identity (A) of the possessor (i.e., A), which can be represented by a proof of possession equation:

$$p_{t,A} = S_I(A)$$

and provides the requested data. In step 502, the item (I) signs the message with $S_I(A)$. The Item (I) sends the signature $S_I(A)$ to A in step 504. In step 506, A stores $S_I(A)$ as her proof of possession ($p_{t,A}$).

A number of security issues may arise by using the above described signature-based protocol to authenticate event data. As an example, A is not necessarily required to authenticate a request that may allow the tag (t) to sign every identity presented. Therefore, A can produce proofs of possession for every identity she wishes. One solution to this problem may include authenticating A. Such authentication can be achieved, for example, by implementing a public-key certificate.

FIG. 6 is a flowchart illustrating exemplar steps that can be executed to provide a shared secret proof of possession in accordance with implementations of the present disclosure. In the shared secret proof of possession technique, the proofs of possession are based on communication between a supply chain partner (A, in this example) and a trusted third party (T). For example, the shared secret proof of possession can be generated based on a signature generated by a tag associated with a particular item (I). In a shared secret proof of possession, each tag (t) has a shared secret (s) with one or more trusted third parties (T). In some implementations, a trusted third party (T) may be a producer of the tag (t) (e.g., an RFID tag), for example. The producer of the tag (t) can embed information in the tag before releasing the tag to a purchaser. In some implementations, a trusted third party (T) may be a time server. One advantage of using a trusted third party (T) is that it can easily authenticate a partner (e.g., A), and all communication with the trusted third party (T) can be done over secure, authenticated channels.

The exemplar steps of FIG. 6 can be executed when a supply chain member (e.g., A), who possesses the item (I), desires to run a protocol between the tag (t) and the trusted third party (T). A plurality of passes (e.g., two) is provided through certain steps to determine a shared secret proof of possession and to verify a timestamp on the tag (t). In step 600 a variable x is initialized to be equal to 1. In step 602, A sends a message to the trusted third party (T). Because the trusted third party (T) has a shared secret (s) between a supply chain partner and itself, (T) can request proof of knowledge of the secret (s) by responding to A with a random challenge (r) in step 604. The random challenge (r) may be a random number selected by the trusted third party (T), or another party. In step 606, A provides the random challenge (r) to the item (I), which is in A's possession. The item (I) responds to A with a message authentication code (MAC) based on the received random challenge (r) and the secret (s) in step 608. In step 610, A provides the MAC to the trusted third party (T) for authentication.

In step 612, the trusted third party (T) determines whether the MAC sent from A is correct. If the MAC is not correct, the trusted third party (T) does not generate the proof of possession ($p_{t,A}$). If the MAC is correct, it is determined whether x is equal to 2 in step 616. If x is not equal to 2, the trusted third party (T) records a timestamp (time) in step 618, increments x in step 620, and loops back to step 602. For example, the trusted third party (T) can store a timestamp of the current transaction on the tag (t). The timestamp can be used to incorporate secure time into proofs of possession. For example, in a validity check of the chain, the trusted third party (T) can verify that the time of the proofs is decreasing for upstream requests and is increasing for downstream requests. As one advantage, the timestamp verification can ensure additional time integrity of the supply chain making insertions after the fact nearly impossible. If x is equal to 2 in step 616, the trusted third party (T) generates the proof of possession ($p_{t,A}$) based on the current time in step 622. In step 624, the trusted third party (T) sends the proof of possession ($p_{t,A}$) to A as an approval.

The shared secret proof of possession and timestamp data can enable a message (e.g., a signature string produced by A) to be verified by anyone with access to A's public keys or public information. It ensures that the timestamp is within an appropriate time interval (e.g., a time interval within which A was in possession of the item (I)). Further, the random variable (r) can prevent pre-dating (e.g., querying a time server before one has possession of an item for the first time), and (r) can prevent post-dating (e.g., querying a time server after one has had possession of the item).

In some implementations, it may be useful to limit the responsibilities of the trusted third party. In general, the trusted third party (T) that is responsible for issuing the decryption keys in the identity-based encryption scheme potentially has access to all event data. Assuming that guessing a tag identifier and a supply chain path is a sufficient hurdle, the party (T) can still access the event data itself after a legitimate access request.

In one implementation, the system can raise the bar for the trusted third party (T) by not revealing the tag identifier in a request. The trusted third party (T) would then have to guess the identifier and a link in the supply chain to access the event data. It may also be possible to protect the identifier during a decryption key request. Protecting the identifier may involve having a trusted third party (T) verify a proof of possession for a particular item and also verify a signature for the item. In this example, the trusted third party (T) has a public key for every item in the system and the trusted third party (T) must reveal the tag identifier to identify the key. One solution to avoid the requirement of revealing the tag identifier may include introducing a common key for each item (e.g. each item from one manufacturer). Another solution is to introduce a different trusted third party (T'). The function of this different trusted third party (T') is to convert a proof of possession of the time-based form into one of the time-based and signature based form. While this solution may reveal the identity of the item in the field 1, it can be verified without knowledge of any key of I.

Figure 7:
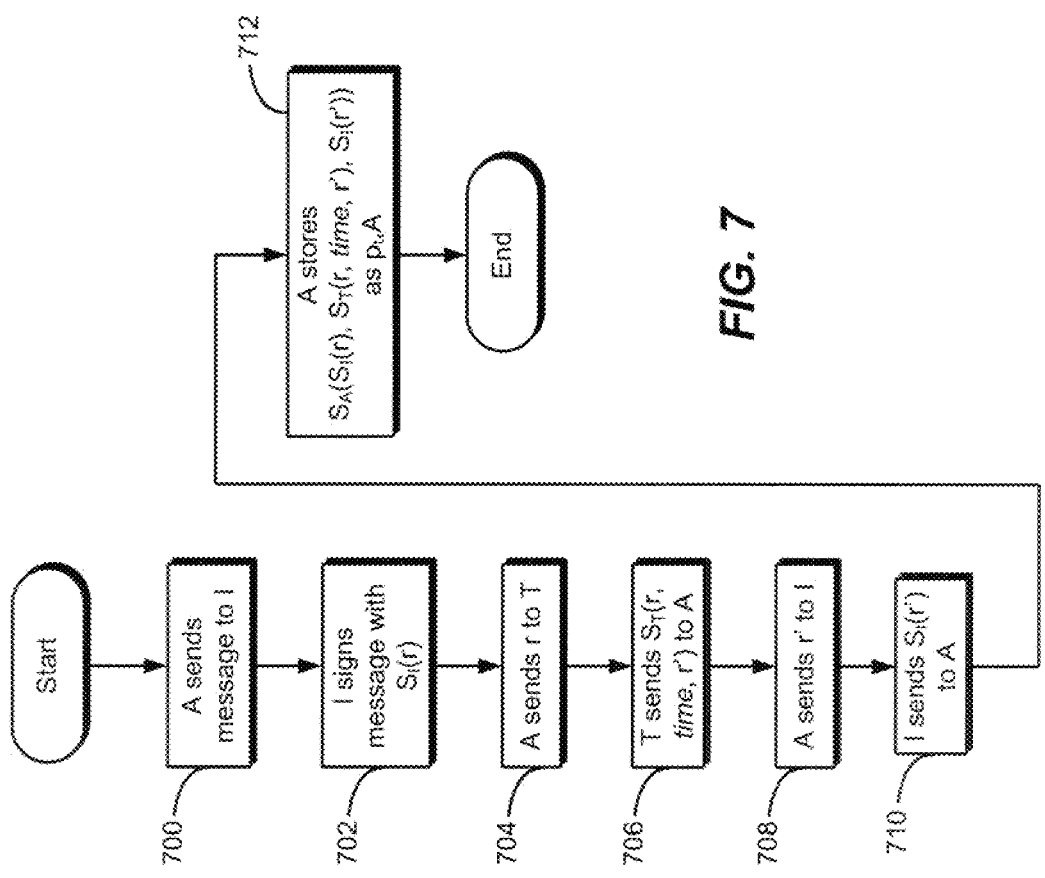
FIG. 7 is a flowchart illustrating exemplar steps that can be executed to provide a time-based proof of possession in accordance with implementations of the present disclosure.

Referring now to FIG. 7, a flowchart illustrates exemplar steps that can be executed to provide a time-based proof of possession in accordance with implementations of the present disclosure. In the time-based approach, the proofs of possession are based on communication between a supply chain partner (e.g., A) and a trusted third party (T). For example, the time-based proof of possession can be generated based on a random challenge sent to the trusted third party (T) and a timestamp issued by the trusted third party (T).

Time-based techniques rely on a time ordered process for each supply chain partner. For example, a materials supplier generally has access to raw material data before a product manufacturer receives the raw material to produce a product. Consequently, the product manufacturer can not obtain information regarding the raw material before the material supplier actually allows access. This order may be reflected in the time the chaining tokens and the proofs of possession have been obtained. Therefore, a time-based technique can be incorporated to secure a known timestamp into proofs of possession. This can ensure that a trusted third party can verify that the time of the proofs is decreasing for upstream supply chain requests and is increasing for downstream supply chain requests.

In step 700, A sends a message to the item (I). The item (I) signs the message with a signature $S_I(r)$ in step 702, where (r) is a random challenge. A secure time protocol is executed between A and a trusted third party (T) (e.g., a time server) to ensure that the time-based proof of possession is valid. For example, given the random challenge (r), the system returns a signed message with the challenge (r), the current time (time), and a fresh nonce (r'). To achieve this, A sends the challenge (r) to the trusted third party (T) in step 704, and the trusted third party (T) sends a proof of possession string $S_T(r, time, r')$ to A in step 706.

In step 708, A sends the fresh nonce (r') to the item (I). The item (I) generates a new time-based signature $S_I(r')$, and sends $S_I(r')$ to A in step 710. A generates and stores the proof of possession $(p_{t,A})$ as $S_A(S_I(r), S_T(r, time, r'), S_I(r'))$ in step 712. The signature string produced by A can be verified by anyone with access to the public keys or public information for item (I). The signature string ensures that time is within the time interval, in which A possessed the item (I). The random challenge (r) prevents pre-dating (e.g., querying the time server before one has possession of an item (I) for the first time), and prevents post-dating, (e.g., querying the time server after one has had possession of the item (I)). While the time-based proof of possession protocol can provide authenticity, it does not necessarily prevent rogue readers from physical attacks. Thus, other protocols can be combined with the time-based proof of possession techniques to provide increased security.

Figure 8:
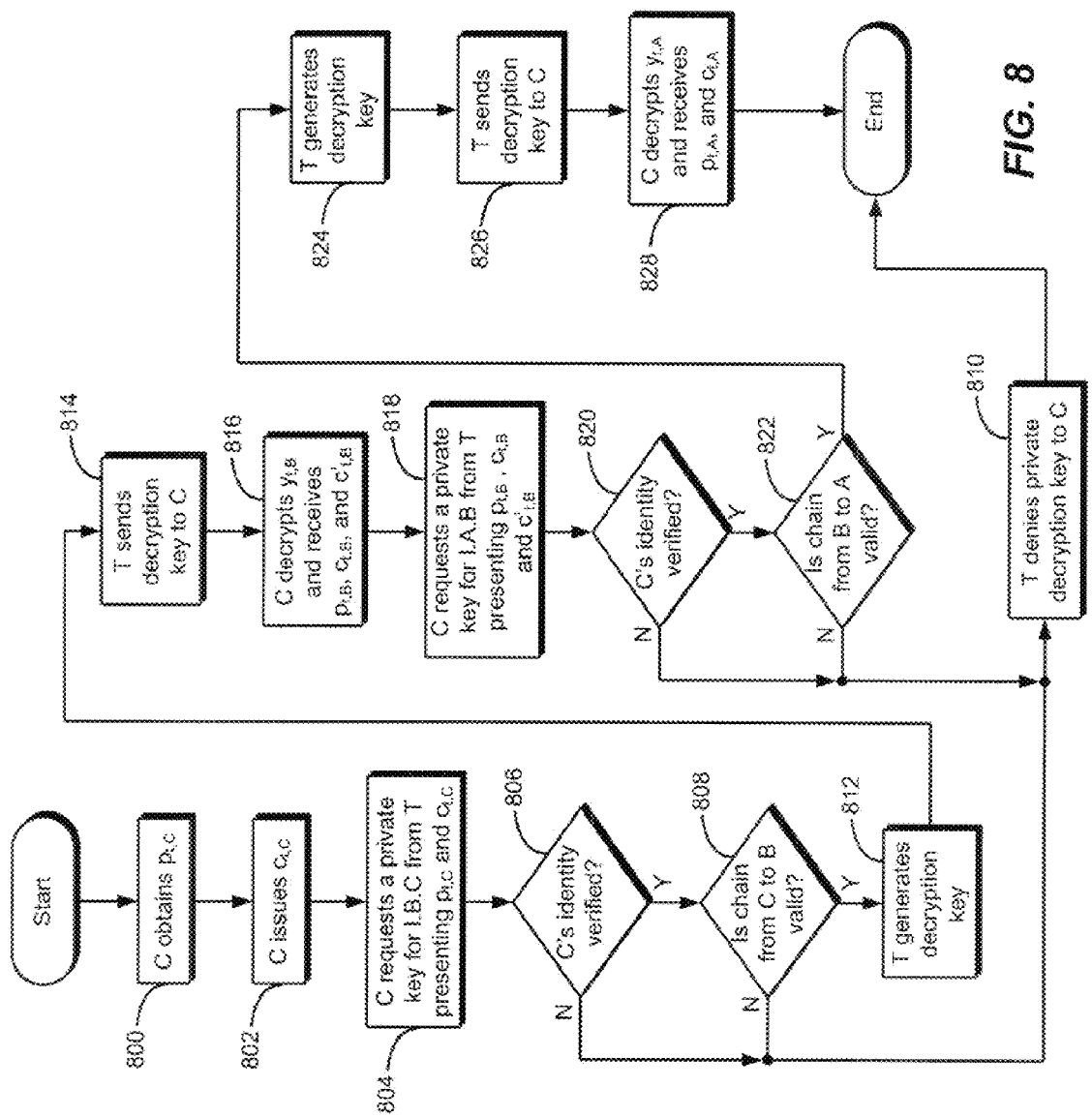
FIG. 8 is a flowchart illustrating exemplar steps that can be executed to provide an identity-based encryption in accordance with implementations of the present disclosure.

Referring now to FIG. 8 a flowchart illustrates exemplar steps that can be executed to provide an identity-based encryption in accordance with implementations of the present disclosure. Before granting access to event data (and tokens and proofs of possession) for an item, a supply chain partner should verify at least two properties of the data: (1) a chain of tokens and proofs of possession presented by the requestor leading from the requestor to itself, and (2) ownership by the accessed party of a chaining token for the requested identifier to successor in the presented chain above. In general, a legitimate request for access to event data reveals a great deal of information about a particular item (I). In the worst case, it may reveal the entire history of possessors of the item (I). For example, if an attacker can create the impression that they had possession of the item (I), another party may try to request access for event data from the attacker. Thus, a requester should attempt to reveal very little or no information during an access request.

In some implementations, an attack from an unknown identity can be unable to retrieve information, if the supply chain employs identity-based encryption (IBE). For example, IBE enables the use of any string for encryption (e.g. an identity). The decrypting party can then request a decryption key from a trusted third party (T) for that particular string. In one example, a supply chain partner C obtains pedigree information of an item upstream by using the exemplar process depicted in FIG. 8, described in further detail below. This process includes obtaining a proof of possession, issuing a chaining token, requesting a private key for the identity, issuing a private decryption key, decrypting event data, and iterating through the requesting of key information and decrypting event data.

In step 800, C obtains a proof of possession $(p_{t,C})$ as evidence that he is indeed in possession of the item (I). C can obtain the proof of possession $(p_{t,C})$ using any of the techniques described herein. In step 802, C issues a sent chaining token $(c_{t,C})$ to supplier B. C requests a private key for the identity "I.B.C." from a trusted third party (T) by presenting the proof of possession $(p_{t,C})$ and the sent chaining token $(c_{t,C})$ in step 804. A series of verification tests are executed to validate the information presented by C. For example, it is determined whether C's identity can be verified in step 806, and whether the chain from C to B is valid in step 808. These verification tests generally include checking the validity of a proof of possession and a chaining token by C to its predecessor P. For every predecessor, there are two valid chaining tokens (e.g., sent and received), such that the successor of P is given in the sent token and the predecessor of P in the received token. In some implementations, the trusted third party (T) can iterate these checks until P is equal to B.

If either step 806 or step 808 is not true, the trusted third party (T) denies the private decryption key to C in step 810. If both step 806 and step 808 are true, the trusted third party (T) generates the decryption key in step 812, and sends the decryption key to C in step 814. In step 816, C decrypts the event data $(y_{t,B})$ and receives the proof of possession $(p_{t,B})$, the sent chaining token $(c_{t,B})$, and the received chaining token $(c'_{t,B})$. In step 818, C requests a private key for the identity "I.A.B." from the trusted third party (T), by presenting the proof of possession $(p_{t,B})$, the sent chaining token $(c_{t,B})$, and the received chaining token $(c'_{t,B})$.

A series of verification tests can be performed to validate the information presented by C. For example, in step 820, it is determined whether C's identity can be verified, and in step 822, whether the chain from B to A is valid. If either step 820 or step 822 is not true, the trusted third party (T) denies the private decryption key to C in step 810. If both step 820 and step 822 are true, the trusted third party (T) generates the decryption key in step 824, and sends the decryption key to C in step 826. In step 828, C decrypts the event data $(y_{t,A})$, and receives the proof of possession $(p_{t,A})$ and the sent chaining token $(c_{t,A})$.

In some implementations, a supply chain partner may choose not to reveal their data according to either upstream or downstream visibility. In such cases, the particular partner can and should encrypt proofs of possession and chaining tokens to ensure the supply chain is not broken. In the exemplar case of upstream visibility, this may allow supply chain partners, who are subsequent to the particular partner in the supply chain, to obtain data from the partners that precede the particular partner. In the exemplar case of downstream visibility, this may allow partners, who are prior to the particular partner in the supply chain, to obtain data from the partners that supersede the particular partner.

Figure 9:
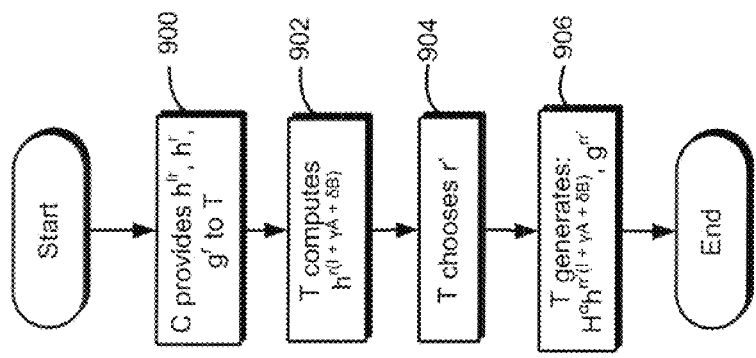
FIG. 9 is a flowchart illustrating exemplar steps that can be executed to decrypt supply chain data in accordance with implementations of the present disclosure.

Referring now to FIG. 9, a flowchart illustrates exemplar steps that can be executed to decrypt supply chain data in accordance with implementations of the present disclosure. In the example of FIG. 9, a proof of possession can be represented by:

$$p_{t,A} = S_T(A, I, \text{time})$$

and a chaining token can be represented by:

$$t_{I,A} = S_A(I, B, \text{sent}|\text{received}).$$

Both contain the identifier (I). The identifier (I) can be replaced with the pair ($h^{Ir}$, $g^r$), where (r) is represented by a random number chosen by a producer of the identifier. In some implementations, the identifier is also randomized, such that it is not simply replaced by a different identifier, but every instance of the pairs appears different from one another. Furthermore, let D(I) and D(A) be the domain of tag and party identifiers, respectively. The key request for the identifier (I.A.B) can be encoded as a natural number σ, provided as $$\sigma = I + \gamma A + \delta B$$

where:

$$\gamma \geq D(I) \text{ and } \delta \geq \gamma D(A).$$

When requesting a decryption key from a trusted third party (T), the requestor generally asks for the tag identifier only, but does not send the identifier for the tag.

In step 900, C provides the trusted third party (T) with an extended pair ($h^{Ir}$, $h^r$, $g^r$). The trusted third party (T) knows the supply chain partners B and C, and computes the full identity key $h^{r'(I+\gamma A+\delta B)}$ in step 902. The trusted third party (T) chooses a fresh random number (r') in step 904, and performs verification checks (e.g., such as those detailed in FIG. 8). Upon successfully passing the verification checks, the trusted third party (T) generates the extended pair ($h^\alpha h^{rr'(I+\gamma A+\delta B)}$, $g^{rr'}$) in step 906 to decrypt the requested supply chain data. The trusted third party (T) can also perform a verification that all proofs of possession, chaining tokens, and requests are for the same identifier. For example, the trusted third party (T) can perform a pair-wise check for every supplied pair of identifiers ($h^{Ir}$, $g^r$, $h^{Ir'}$, $g^{r'}$) to determine whether the same identifier provides the above criteria.

Figure 10:
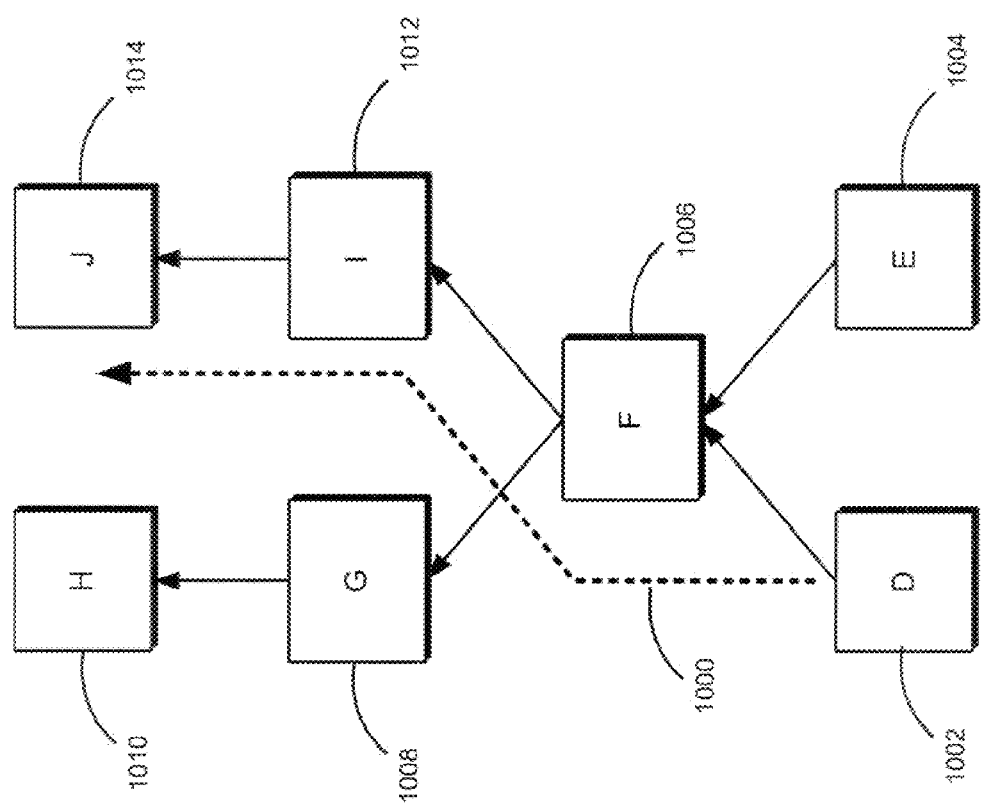
FIG. 10 is a block diagram illustrating another exemplar supply chain.

Referring now to FIG. 10, a functional block diagram illustrates another exemplar supply chain 1000. The supply chain 100 includes suppliers (D) 1002 and (E) 1004, a number of suppliers and/or buyers (F) 1006, (G) 1008, and (I) 1012, and buyers (H) 1010 and (J) 1014. If the buyer (J) 1014 wishes to access event data stored at the supplier (D) 1002, (J) 1014 must present a number of proofs of possession and chaining tokens along the supply chain 1000. Specifically, (J) 1014 presents chaining tokens for each supplier and/or buyer between supplier (D) 1002 and himself. For example, (J) 1014 can supply his proof of possession and received chaining token, (I)'s 1012 proof of possession and received and sent chaining tokens, and (F)'s 1006 proof of possession and received and sent chaining tokens. If (I) 1012 wishes to access event data stored at the supplier (D) 1002 or (E) 1004, (I) 1012 can present his own proof of possession and received chaining tokens, and (F)'s 1006 proof of possession and received and sent chaining tokens. Similarly, if (G) 1008 wishes to access event data stored at supplier (D) 1002 or (E) 1004, (G) 1008 can provide proofs of possession and chaining tokens for himself and (F) 1006.

At a high level, the systems described herein provide usability, correctness and security. Usability can be achieved by enabling the user set its policies at a high level (i.e. upstream or downstream visibility). Furthermore, the user may have the choice of these options for every item where one item can have different high-level policies than another item. As an advantage, the system designer can choose a desired level of policy granularity. Correctness implies that every legitimate entity has access to the data. If one allows upstream visibility, every partner before a partner in the supply chain for that particular item should have access. If one allows downstream visibility, the same should hold for any party after one in the supply chain. As for the security objectives, the systems described herein provide confidentiality, integrity, no illegitimate access, no forgery, no framing, and non-repudiation characteristics. Confidentiality ensures that no partner should have access to event data that is not explicitly allowed by the policies (e.g., no illegitimate access). Integrity of the system ensures that no partner should be able to forge event data (e.g., no forgery), that no partner should be able to frame another partner to have possessed the item (e.g., no framing), and that no partner should be able to repudiate having possessed the item (e.g., non-repudiation).

Figure 11:
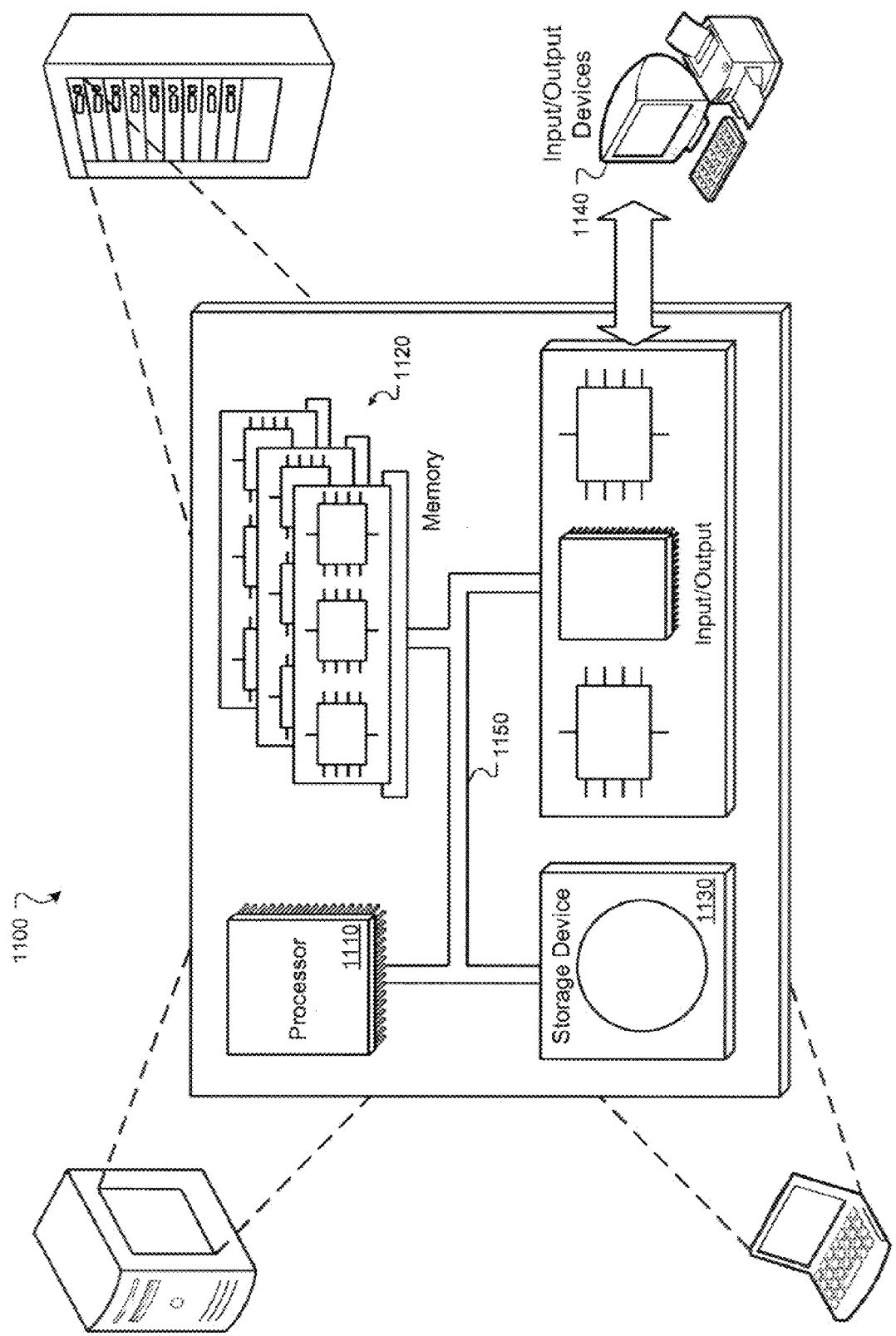
FIG. 11 is a schematic illustration of exemplar computer systems that can be used to execute implementations of the present disclosure.

Referring now to FIG. 11, a schematic diagram of an exemplar computer system 1100 is provided. The system 1100 can be used for the operations described in association with the methods described in FIGS. 3-10 according to one implementation. For example, the system 1100 may be included in any or all of the servers 102. The system 1100 includes a processor 1110, a memory 1120, a storage device 1130, and an input/output device 1140. Each of the components 1110, 1120, 1130, and 1140 are interconnected using a system bus 1150. The processor 1110 is capable of processing instructions for execution within the system 1100. In one implementation, the processor 1110 is a single-threaded processor. In another implementation, the processor 1110 is a multi-threaded processor. The processor 1110 is capable of processing instructions stored in the memory 1120 or on the storage device 1130 to display graphical information for a user interface on the input/output device 1140.

The memory 1120 stores information within the system 1100. In one implementation, the memory 1120 is a computer-readable medium. In one implementation, the memory 1120 is a volatile memory unit. In another implementation, the memory 1120 is a non-volatile memory unit. The storage device 1130 is capable of providing mass storage for the system 1100. In one implementation, the storage device 1130 is a computer-readable medium. In various different implementations, the storage device 1130 may be a floppy disk device, a hard disk device, an optical disk device, or a tape device. The input/output device 1140 provides input/output operations for the system 1100. In one implementation, the input/output device 1140 includes a keyboard and/or pointing device. In another implementation, the input/output device 1140 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of embodiments of the invention have been described. Nevertheless, it will be understood that various modifications may be made without departing from the spirit and scope of the invention. Accordingly, other embodiments are within the scope of the following claims.

What is claimed is:

1. A method for implementing visibility policies within a supply chain that includes a plurality of partners, the method being performed by one or more processors and comprising:
    storing, by the one or more processors, event data on a non-transitory computer-readable storage medium of a first partner, the event data corresponding to at least one event associated with an item while the item was in possession of the first partner;
    transferring, by the one or more processors, the item and a first proof of possession from the first partner to another partner in the supply chain;
    receiving, by the one or more processors, a request for access to the event data by a second partner in the supply chain, the request being received from the second partner and including a set of proofs of possession and a set of chaining tokens, the set of proofs of possession comprising a second proof of possession of the second partner and one or more proofs of possession of any intermediate partners between the first partner and the second partner in the supply chain, the set of chaining tokens comprising a first chaining token indicating that the second partner received the item in the supply chain, and at least two chaining tokens associated with any intermediate partners between the first partner and the second partner indicating that the intermediate partners received the item from and sent the item to specific partners in the supply chain, wherein at least one of the first proof of possession corresponding to the first partner and the second proof of possession corresponding to the second partner is provided as one of a signature-based proof of possession a shared secret proof of possession, a token-based proof of possession and a time-based proof of possession, an evidence comprising the proof of possession;
    determining, by the one or more processors, that the item traveled through a portion of the supply chain associated with at least the first partner and the second partner, based on the set of proofs of possession;
    authenticating, by the one or more processors, the identity of the second partner based on the set of chaining tokens and the set of proofs of possession; and
    authorizing, by the one or more processors, the second partner to access the first event data from the computer-readable storage medium of the first partner, in response to determining that the item traveled through the portion of the supply chain and the identity of the second party being authenticated.

2. The method of claim 1, wherein the shared secret proof of possession and the time-based proof of possession are generated based on communication between the second partner and a trusted third party.

3. The method of claim 1, wherein the signature-based proof of possession is generated based on a signature generated by a tag associated with the item, the shared secret proof of possession is generated based on a secret that is shared between a tag associated with the item and a first trusted third party, and the time-based proof of possession is generated based on a random challenge sent to a second trusted third party and a timestamp issued by the second trusted third party.

4. The method of claim 1, further comprising:
    encrypting, by the one or more processors, the event data by the first partner;

obtaining, by the one or more processors, a decryption key from a trusted third party based on the set of proofs of possession and the set of chaining tokens; and decrypting, by the one or more processors, the event data using the decryption key by the second partner.

5. The method of claim 1, wherein authenticating the identity of the second partner is further based on a sent chaining token indicating that the first partner sent the item to another partner in the supply chain, the sent chaining token being possessed by the first partner.

6. A non-transitory, computer-readable storage medium coupled to one or more processors and having instructions stored thereon which, when executed by the one or more processors, cause the one or more processors to perform operations comprising:

storing, by the one or more processors, event data on the non-transitory computer-readable storage medium of a first partner, the event data corresponding to at least one event associated with an item while the item was in possession of the first partner;

transferring, by the one or more processors, the item and a first proof of possession from the first partner to another partner in the supply chain;

receiving, by the one or more processors, a request for access to the event data by a second partner in the supply chain, the request being received from the second partner and including a set of proofs of possession and a set of chaining tokens, the set of proofs of possession comprising a second proof of possession of the second partner and one or more proofs of possession of any intermediate partners between the first partner and the second partner in the supply chain, the set of chaining tokens comprising a first chaining token indicating that the second partner received the item in the supply chain, and at least two chaining tokens associated with any intermediate partners between the first partner and the second partner indicating that the intermediate partners received the item from and sent the item to specific partners in the supply chain, wherein at least one of the first proof of possession corresponding to the first partner and the second proof of possession corresponding to the second partner is provided as one of a signature-based proof of possession, a shared secret proof of possession, a token-based proof of possession and a time-based proof of possession, an evidence comprising the proof of possession;

determining, by the one or more processors, that the item traveled through a portion of the supply chain associated with at least the first partner and the second partner, based on the set of proofs of possession;

authenticating, by the one or more processors, the identity of the second partner based on the set of chaining tokens and the set of proofs of possession; and authorizing, by the one or more processors, the second partner to access the first event data from the computer-readable storage medium of the first partner, in response to determining that the item traveled through the portion of the supply chain and the identity of the second party being authenticated.

7. The storage medium of claim 6, wherein the shared secret proof of possession and the time-based proof of possession are generated based on communication between the second partner and a trusted third party.

8. The storage medium of claim 6, wherein the signature-based proof of possession is generated based on a signature generated by a tag associated with the item, the shared secret proof of possession is generated based on a secret that is shared between a tag associated with the item and a first trusted third party, and the time-based proof of possession is generated based on a random challenge sent to a second trusted third party and a timestamp issued by the second trusted third party.

9. The storage medium of claim 6, further comprising:
encrypting the event data by the first partner;
obtaining a decryption key from a trusted third party based on the set of proofs of possession and the set of chaining tokens; and
decrypting the event data using the decryption key by the second partner.

10. The storage medium of claim 6, wherein authenticating the identity of the second partner is further based on a sent chaining token indicating that the first partner sent the item to another partner in the supply chain, the sent chaining token being possessed by the first partner.

11. A system for implementing visibility policies within a supply chain that includes a plurality of partners, comprising:
one or more processors; and
a non-transitory computer-readable storage medium coupled to the one or more processors having instructions stored thereon which, when executed by the one or more processors, cause the one or more processors to perform operations comprising:

storing, by the one or more processors, event data on a computer-readable storage medium of a first partner, the event data corresponding to at least one event associated with an item while the item was in possession of the first partner;

transferring, by the one or more processors, the item and a first proof of possession from the first partner to another partner in the supply chain;

receiving, by the one or more processors, a request for access to the event data by a second partner in the supply chain, the request being received from the second partner and including a set of proofs of possession and a set of chaining tokens, the set of proofs of possession comprising a second proof of possession of the second partner and one or more proofs of possession of any intermediate partners between the first partner and the second partner in the supply chain, the set of chaining tokens comprising a first chaining token indicating that the second partner received the item in the supply chain, and at least two chaining tokens associated with any intermediate partners between the first partner and the second partner indicating that the intermediate partners received the item from and sent the item to specific partners in the supply chain, wherein at least one of the first proof of possession corresponding to the first partner and the second proof of possession corresponding to the second partner is provided as one of a signature-based proof of possession, a shared secret proof of possession, a token-based proof of possession and a time-based proof of possession, an evidence comprising the proof of possession;

determining, by the one or more processors, that the item traveled through a portion of the supply chain associated with at least the first partner and the second partner, based on the set of proofs of possession;

authenticating, by the one or more processors, the identity of the second partner based on the set of chaining tokens and the set of proofs of possession; and authorizing, by the one or more processors, the second partner to access the first event data from the computer-readable storage medium, in response to determining that the item traveled through the portion of the supply chain and the identity of the second party being authenticated.

12. The system of claim 11, wherein the shared secret proof of possession and the time-based proof of possession are generated based on communication between the second partner and a trusted third party.

13. The system of claim 11, wherein the signature-based proof of possession is generated based on a signature generated by a tag associated with the item, the shared secret proof of possession is generated based on a secret that is shared between a tag associated with the item and a first trusted third party, and the time-based proof of possession is generated based on a random challenge sent to a second trusted third party and a timestamp issued by the second trusted third party.

14. The system of claim 11, wherein authenticating the identity of the second partner is further based on a sent chaining token indicating that the first partner sent the item to another partner in the supply chain, the sent chaining token being possessed by the first partner.

\* \* \* \* \*